United States Patent [19]

Wheeler et al.

[11] 4,055,440
[45] Oct. 25, 1977

[54] PIGMENT COMPOSITIONS

[75] Inventors: Ian Robert Wheeler, Houston; George Heddle Robertson, Paisley, both of Scotland

[73] Assignee: Ciba-Geigy Corporation, Ardsley, N.Y.

[21] Appl. No.: 720,029

[22] Filed: Sept. 2, 1976

[30] Foreign Application Priority Data

Sept. 9, 1975  United Kingdom .............. 37106/75

[51] Int. Cl.² .............................................. C08K 5/34
[52] U.S. Cl. ............................ 106/288 Q; 106/308 N
[58] Field of Search ...................... 106/288 Q, 308 N; 260/314.5, 37 N

[56] References Cited

U.S. PATENT DOCUMENTS

| 3,754,958 | 8/1973 | Giambalvo | 106/288 Q |
| 3,884,713 | 5/1975 | Langley et al. | 106/288 Q |

*Primary Examiner*—Winston A. Douglas
*Assistant Examiner*—J. V. Howard
*Attorney, Agent, or Firm*—Vincent J. Cavalieri

[57] ABSTRACT

A phthalocyanine pigment composition comprising a phthalocyanine pigment and a sulphonated phthalocyanine derivative formed from sulphonated phthalocyanine dyestuffs having the formula:

I

-continued

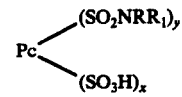

and a sufficient quantity of dehydroabietylamine having the formula

II

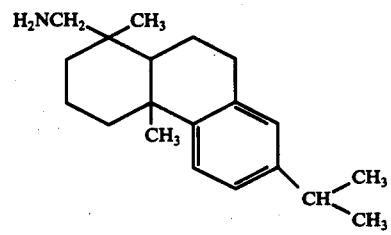

to substantially neutralize the free sulphonic acid groups, wherein R represents a $C_1$-$C_{22}$ cyclic or acyclic alkyl group, aryl, aralkyl group or a dehydroabietylamine residue; and $R_1$ represents hydrogen or a $C_1$-$C_{22}$ cyclic or acyclic alkyl group, an aryl or an aralkyl group; the alkyl, cycloalkyl, aryl or aralkyl groups, R and $R_1$ may be optionally substituted with one or more hydroxyl groups; $x$ is from 1 to 4, $y$ is 0 or from 1 to 3 and the sum of $x + y$ is from 1 to 4 gives printing inks and paint media having improved tinctorial strength, gloss and especially improved rheological properties.

6 Claims, No Drawings

PIGMENT COMPOSITIONS

The present invention relates to pigment compositions containing a phthalocyanine pigment.

In our British Pat. No. 1263684 there is described and claimed:

A process in which a pigment is treated comprising contacting a metal phthalocyanine blue pigment, in dry pigmentary form, with a polar aliphatic solvent which is at least partially water-miscible, and separating the solvent from the treated pigment, in which process there is added to the metal phthalocyanine blue pigment before it is contacted with the solvent, during the contacting, or after it has been separated from the solvent, a minor proportion of a copper phthalocyanine derivative having the formula:

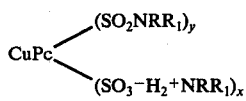

wherein CuPc represents the copper phthalocyanine residue, either chlorinated or unchlorinated, R represents a cylic or acyclic alkyl group having from 1 to 20 carbon atoms or an aryl group, and $R_1$ represents hydrogen or a cyclic or acyclic alkyl group having from 1 to 20 carbon atoms or an aryl group, the alkyl or aryl groups being either unsubstituted or substituted by hydroxyl, amino, alkylamino or amide substituents, and $x$ and $y$ represent 1, 2 or 3 with the proviso that the sum of $x$ and $y$ is 2, 3 or 4.

We have now unexpectedly found that if the amine $RR_1NH$ in the salt residue or optionally on both the salt and any sulphonamide residues in the phthalocyanine derivative of the above formula is dehydroabietylamine the resulting compositions have superior flow, strength and gloss in paint and ink to those previously known.

Accordingly the present invention provides a phthalocyanine pigment composition comprising a phthalocyanine pigment and a sulphonated phthalocyanine derivative formed from sulphonated phthalocyanine dyestuffs having the formula:

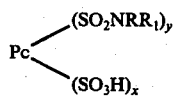

I and a sufficient quantity of dehydroabietylamine having the formula

II

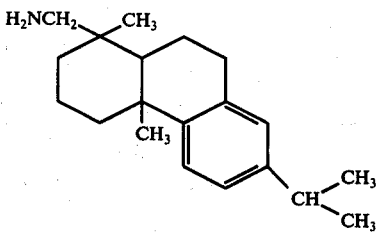

to substantially neutralise the free sulphonic acid groups, wherein R represents a $C_1 - C_{22}$ cyclic or acyclic alkyl group, aryl, aralkyl group or a dehydroabietylamine residue; and $R_1$ represents hydrogen or a $C_1 - C_{22}$ cyclic or acyclic alkyl group, an aryl or an aralkyl group; the alkyl, cycloalkyl, aryl or aralkyl groups, R and $R_1$ may be optionally substituted with one or more hydroxyl groups; $x$ is from 1 to 4, $y$ is 0 or from 1 to 3 and the sum of $x + y$ is from 1 to 4; both $x$ and $y$ represent the average number of groups per phthalocyanine nucleus in a given sample.

The phthalocyanine dyestuff may be metal free, or it may be a zinc, copper, cobalt, nickel or other transition metal phthalocyanine and may contain halogen, especially chlorine, in the phthalocyanine molecule. Copper phthalocyanine dyestuffs are preferred.

The phthalocyanine pigment may be metal free or it may be a zinc, copper, nickel or other transition metal phthalocyanine, and may contain up to 50% by weight of chlorine. The preferred pigment is a copper phthalocyanine, which may be in either the alpha or beta crystalline form, or a mixture of the two.

The ratio of phthalocyanine pigment to sulphonated copper phthalocyanine dyestuff of formula I may be from 80:20 to 99:1 by weight, but preferably from 90:10 to 96:4.

While $x$ can be from 1 to 4 and $y$ can be from 0 to 3, those compounds of formula I are preferred in which $x$ is 1 - 2.5 and $y$ is 0 - 3.

When the substituents R and $R_1$ of the sulphonated phthalocyanine dyestuff (I) represent a $C_1 - C_{22}$ cyclic or acyclic alkyl, aryl or an aralkyl group, each may be for example a methyl, ethyl, propyl, butyl, hexyl, cyclohexyl, octyl, decyl, hexadecyl, octadecyl, eicosyl, phenyl, benzyl and dodecylphenyl or 2-hydroxyethyl group.

The sulphonated phthalocyanine derivatives which are formed by the combination of compounds of formula I and II may be produced, for example by reacting a copper phthalocyanine compound containing x sulphonic acid groups and y sulphonyl chloride or sulphonamide groups with a sufficient quantity of dehydroabietylamine to substantially neutralise the free sulphonic acid groups, and to react with the sulphonyl chloride groups if present.

The sulphonated phthalocyanine derivative may be incorporated into the pigment at various stages in the preparation, treatment or use of the pigment. It can be added to the pigment when in the form of an aqueous slurry, or during solvent treatment of the pigment, such as the solvent treatment described and claimed in British Patent Specification No. 1140836. In these two cases the sulphonated derivative can be preformed and then added, or it can be formed in situ in the mixture. The sulphonated derivative can be added during milling of the pigment, for example in a bead mill or the sulphonated derivative, as a powder can be simply mixed with the pigment powder before use.

The preferred methods of incorporation are (a) to add the phthalocyanine dye and amine separately to the aqueous pigment slurry, forming the sulphonated derivative in situ, (b) adding the preformed derivative to the pigment during solvent treatment of the pigment or (c) forming the derivative in situ during solvent treatment of the pigment.

The pigment compositions of the invention may be used for pigmenting various media. They can be used in decorative paint, in publication gravure inks, nitrocellulose, alkyd-M/F and acrylic-M/F systems.

It can be seen in the following Examples that the sulphonated derivatives promote good flow and flow stability in systems which would otherwise be thick and/or thixotropic, and also accelerate the rate of dispersion. They are of particular value in the preparation of high pigment content dispersions of good rheology when used in combination with the urethane compounds of our co-pending British Application No. 46746/72. The urethane compounds are water insoluble compounds which contain two or more urethane groups and which contain no significant proportion of basic amino groups.

These urethane compounds preferably have either the formula:

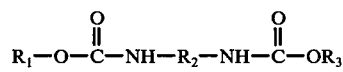

wherein $R_1$ and $R_3$ are derived from monohydroxyl compounds or the formula:

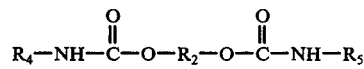

wherein $R_4$ and $R_5$ are derived from monoisocyanate compounds, and wherein $R_2$ is an organic bridging residue. The preferred solvents in such dispersions are the aromatic and aliphatic hydrocarbons.

The invention is illustrated by the following Examples in which parts and percentages are expressed by weight unless otherwise stated. Parts by weight bear the same relationship to parts by volume as do kilograms to liters.

The Tables which follow the Examples show the properties of compositions containing the treated pigments of the Examples indicated.

EXAMPLE 1

92 Parts of pigmentary beta-copper phthalocyanine were dispersed by high speed stirring in 3000 parts water, with the aid of 0.05 part Lissapol NX (a nonyl phenol/ethylene oxide condensate).

8 Parts of a compound having the formula I with $x = 2\ y = o$

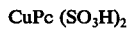 IA were stirred in. The pH was adjusted to 5.0 by the addition of dilute hydrochloric acid or sodium hydroxide solutions as required.

7.2 Parts of a compound having the formula

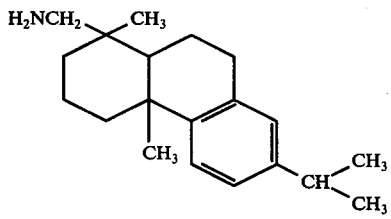

known as Rosin Amine D were added in the form of its 0.2M aqueous acetate solution over a period of 30 minutes. The slurry was stirred a further 30 minutes, then filtered from clear liquors, washed salt-free with water to neutral pH, prior to drying at 50° C.

103 parts of a blue pigment composition were obtained.

EXAMPLE 2 a. In a vessel of 500 parts by volume containing 250 parts of ⅜ inch steatite balls, 30 parts of the product of Example 1 were milled for 16 hours with 52 parts white spirit and 18 parts of the urethane compound III, prepared according to our copending British Application No. 46746/72, by reacting 3 moles of tolylene diisocyanate (a commercial mixture of 2,4 and 2,6 isomers) with 2 moles of ethylene glycol and 2 moles oleyl alcohol in ethylmethylketone at 80° C. for 10 hours, and removing the ethylmethylketone by distillation.

The resulting fluid dispersion had an efflux time through a No. 3 Zahn Cup of 8.5 seconds, and moreover retained this fluidity with time. 2.33 Parts of this dispersion were added with slow speed ($\approx$ 500 rmp) paddle stirring to 70 parts of a white paint of the following composition:

| | |
|---|---|
| TiO$_2$ (R -CR2) | 25% |
| Beckosol P.470 | 56.7% |
| White Spirit | 16.3% |
| Driers solution | 2% |

(Beckosol P.470 is a long oil soya penta alkyd, 70% in white spirit).

b. The method of (a) above was followed except that 30 parts of β-copper phthalocyanine blue pigment, untreated by dyestuff and amine were substituted for the product of Example 1. The paint film so obtained was used as a control against which the products of the invention are assessed in Table 1.

EXAMPLE 3 a. A paint stainer was prepared from the product of Example 1 by charging to a vessel of 500 parts by volume:

| | |
|---|---|
| 16 parts | product of Example 1 |
| 32 parts | Beckosol P.470 |
| 31 parts | White Spirit |
| 250 parts | ⅜" steatite balls |

This was ground for 16 hours. Then there were added 40 parts P.470, milled for 30 minutes, followed by 37 parts P.470 and 3.84 parts driers solution.

The mixture was milled a further 30 minutes and discharged. 7 parts of this stainer were used to prepare a blue paint according to the method of Example 2(a).

b. The method of 3(a) above was followed, except that 16 parts of an untreated beta-phthalocyanine blue pigment were substituted for the product of Example 1.

EXAMPLE 4

100 parts of the compound of formula IA in Example 1 were stirred in 3000 parts water. The pH was adjusted to 5.0 with dilute hydrochloric acid or sodium hydroxide as required. 90 parts of the compound of formula (II) were added in the form of its 0.2M aqueous acetate solution over a period of 30 minutes.

The slurry was stirred a further 30 minutes, then filtered from clear liquor, washed salt-free with water to neutral pH, prior to drying at 50° C.

182 parts of a blue powder were obtained.

EXAMPLE 5

The method of Example 2(a) was repeated, except that 30 parts of the product of Example 1 were replaced by 25.7 parts of untreated beta-copper phthalocyanine and 4.3 parts of the product of Example 4.

EXAMPLE 6

The method of Example 3(a) was repeated, except that 16 parts of the product of Example 1 were replaced by 13.7 parts of untreated beta-copper phthalocyanine and 2.3 parts of the product of Example 4.

EXAMPLE 7

100 parts of crude copper phthalocyanine were ground with 200 parts of inorganic salts until the phthalocyanine was in pigmentary form.

276 parts of the mixture (=92 parts copper phthalocyanine) were added to 900 parts of isopropanol and heated under reflux conditions for 4 hours.

900 parts of water and 8 parts of the compound of formula 1A of Example 1 were added to the mixture, and the isopropanol removed by distillation. The pH was adjusted to 5.0 with dilute hydrochloric acid and 7.2 parts of the compound of formula (II) were added, in the form of its 0.2M aqueous acetate solution, over 30 minutes.

The slurry was stirred a further 30 minutes, then filtered from clear liquors, washed salt-free with water to neutral pH prior to drying at 50° C.

102 parts of a blue pigment composition were obtained.

Substantially similar results were obtained when the compounds IA and (II) of this example were replaced by the addition of 15.2 parts of the product of Example 4, either before, during or after the isopropanol treatment stage.

EXAMPLE 8

The method of Example 2 a) was repeated, using 30 parts of the product of Example 7 in place of 30 parts of the product of Example 1.

Displays of the paints of the foregoing Examples were prepared using a No. 7 wire wound laboratory coating rod (k-bar) on Astralux card. Observations on comparisons as to flow, strength and shade are shown in Tables 1 and 2.

The results demonstrate the improved characteristics of paint compositions using the pigment compositions of this invention in contrast to results using phthalocyanine untreated by dyestuff and amine.

EXAMPLE 9

The following were charged to a bead mill
100 parts glass beads
25.7 parts crude copper phthalocyanine
4.3 parts of the product of Example 4
6 parts urethane compound (III)
38 parts white spirit Milling was carried out for 4 hours until the viscosity of the mixture increased. The following were then added:
12 parts urethane compound (III)
14 parts white spirit Milling was continued for a further 6 hours at room temperature. The resulting dispersion had an efflux time through a No. 3 Zahn Cup of 12 seconds, and retained this fluidity with time.

A blue tint decorative alkyd paint was prepared from this dispersion according to the latter part of the method of Example 2 (a).

A second dispersion prepared by the method of this example in which 25.7 parts of crude CuPc and 4.3 parts of the product of Example 4 were replaced by 30 parts of crude CuPc was found to increase in viscosity to a greater degree than the dispersion incorporating the product of Example 4, which remained fluid. A long oil alkyd decorative paint prepared from this dispersion by the latter part of the method of Example 2 (a) was 10% weaker and redder relative to the corresponding paint incorporating the product of Example 4.

EXAMPLE 10 a. To a half liter ball mill were charged the following:

| | |
|---|---|
| Steatite balls (10 mm) | 400 parts |
| Phenolic varnish* | 96 parts |
| Toluene | 80 parts |
| Product of Example 1 | 24 parts |
| *Phenolic Varnish consisted of: | |
| Alsynol RL.30 | 50 parts |
| Toluene | 50 parts |

(Alsynol RL.30 is a modified phenolic resin, pentaerythritol esterified).

Milling was carried out for 16 hours, then there were added to 100 parts of the millbase with agitation

| | |
|---|---|
| Phenolic varnish | 72 parts |
| Toluene | 28 parts |

Thus was formed a rotogravure ink of 6% pigmentation and 1:5 Pigment: Binder ratio.

b. Example 10 (a) was repeated, except that the product of Example 1 was replaced by an equal weight of untreated beta-copper phthalocyanine pigment.

EXAMPLE 11 a. In a half liter vessel, containing 250 parts of ⅜ inch steatite balls, 30 parts of the product of Example 1 were milled for 16 hours, with 55 parts of hydrocarbon solvent SBP3 (Shell-Mex) and 15 parts of the urethane compound III of Example 2. The resulting fluid dispersion had an efflux time through a No. 3 Zahn Cup of 9 seconds, and retained this fluidity with time.

20 Parts of this fluid dispersion were added to 60 parts of phenolic varnish with stirring, followed by 20 parts of SBP3. After 10 minutes stirring, the 6% pigmentation ink was discharged.

b. Example 11 (a) was repeated, except that the product of Example 1 was replaced by an equal weight of an untreated beta-copper phthalocyanine pigment.

Illustrations were prepared on newsprint from the inks of Examples 10 (a) – 11 (b). Observations on comparisons as to flow, strength and gloss are shown in Tables 3 and 4.

EXAMPLE 12

Example 1 was repeated, except that 8 parts of the compound IA were substituted by 8 parts of the compound of formula:

$$CuPc\ (SO_2NHCH_2CH_2OH)_2\ (SO_3H)_2 \qquad IV$$

and 7.2 parts of the compound II by 5.4 parts of the compound II.

EXAMPLE 13

Example 4 was repeated, except that the compound of formula IA was replaced by an equal amount of the compound of formula IV of Example 12, with 68 parts of the compound II instead of 90 parts. The yield was 165 parts.

EXAMPLE 14

Example 2 (a) was repeated, except that 30 parts of the product of Example 1 were replaced by 25.7 parts of an untreated beta-copper phthalocyanine blue and 4.3 parts of the product of Example 13.

EXAMPLE 15

Example 2 (a) was repeated, except that 30 parts of the product of Example 1 were replaced by 30 parts of the product of Example 12.

EXAMPLE 16

Example 10 (a) was repeated, except that the product of Example 1 was replaced with an equal weight of the product of Example 12.

EXAMPLE 17

Example 11 (a) was repeated, except that the product of Example 1 was replaced with an equal weight of the product of Example 12.

EXAMPLE 18

The compound of formula:

$$CuPc(SO_2NHC_{20}H_{29})_y(SO_3^-H_3N^+C_{20}H_{29})_x \qquad (V)$$

where $C_{20}H_{29}$ represents a dehydroabietyl residue and in which $x + y \approx 2.5$ was prepared by treating crude CuPc with chlorosulphonic acid at 110° – 113° C. for 5½ hours, and subsequently drowning out into an ice/salt/water mixture. The filtered, washed, presscake was reslurried in more ice/salt/water, the pH adjusted to 5.0 and Rosin Amine D acetate solution added dropwise. After 1 hour at 80°–85° C. sufficient HCl was added to give no blue bleed, and the slurry filtered, washed salt-free and dried at 60° C.

EXAMPLE 19 a. The following were stirred at high speed for 30 minutes:

63 parts untreated beta-copper phthalocyanine pigment
7 parts compound V of Example 18
158.4 parts toluene
237.6 parts medium*

*The medium consisted of
| | |
|---|---|
| Alsynol R.30 | 25 parts |
| Zinc/calcium resinate | 25 parts |
| Toluene | 50 parts |

250 Parts of the stirred slurry was transferred to a half liter ball mill and milled for 10 hours. The final ink (6% pigmentation) was obtained by reducing 60 parts of mill base with 77.4 parts medium and 12.6 parts toluene.

b. Example 19 (a) was repeated, except that the compound V was omitted, and the quantity of untreated beta-copper phthalocyanine pigment used was 70 parts.

Illustrations of Examples 19 (a) and (b) were prepared on newsprint. Observations on comparisons as to flow strength and gloss are shown in Table 4.

EXAMPLE 20

Example 2 (a) was repeated, except that 30 parts of the product of Example 1 were replaced by 25.7 parts of untreated beta-copper phthalocyanine and 4.3 parts of the compound V.

EXAMPLE 21

Example 3 (a) was repeated, except that 16 parts of the product of Example 1 were replaced by 13.7 parts of untreated beta-copper phthalocyanine and 2.3 parts of compound V.

Illustrations of Examples 10 – 21 were prepared as described above. Observations on comparisons are shown in Tables – 4.

EXAMPLES 22 – 25

Pigments with various pigment:dyestuff ratios were prepared according to the method of Example 1, and the amounts of Rosir Amine D adjusted to substantially neutralise the sulphonic acid groups of the dyestuff. Fluid dispersions and decorative alkyd paints were prepared from these pigments by the method of Example 2 (a). The compositions and results are given in Table V, from which it can be seen that an excellent balance of dispersion fluidity and strength can be obtained from a pigment:dyestuff ratio of 94:6.

EXAMPLES 26 and 27

Pigments were prepared according to the method of Example 1, with 8 parts of the compound CuPc $(SO_2NH\ CH_2CH_2OH)_2\ (SO_3H)_x$ with $x = 1$ and 1.5 replacing 8 parts of CuPc $(SO_3H)_2$.

The amounts of Rosin Amine D used were adjusted to substantially neutralise the free sulphonic acid groups of the dyestuff.

Fluid dispersions and decorative alkyd paints were prepared from these pigments by the method of Example 2 (a). The results are compared in Table VI.

EXAMPLE 28

A substantially α-form copper phthalocyanine containing 1.8% by weight of peripherally substituted chlorine, and 10% by weight on pigment of Compound V of Example 18 were incorporated in a glycerol coconut oil alkyd resin solution in xylene/butanol solvents by ballmilling, and subsequently reduced to 5.9% pigmentation at 1:6.6 pigment:binder by the addition of an unmodified isobutylated melamine-formaldehyde (M/F) resin solution. The resulting dispersion had a Hegman gauge reading of 8:7:7 and a Zahn Cup No. 4 reading of 11 seconds.

A dispersion prepared at the same pigmentation and pigment:binder levels, but in the absence of compound V, had a dispersion of 8:5:3 and was thixotropic only pourable after agitation.

Blue tint alkyd-M/F paints prepared from these dispersions by admixing with white alkyd-M/F paint and stoving, had similar strength.

EXAMPLE 29

The product of Example 1 was incorporated in a hydroxyacrylic resin in 4:1 xylene:n-butanol solvent by ballmilling and subsequently reduced to 6% pigmentation and 1:5 pigment binder with an unmodified isobutylated M/F resin in n-butanol solvent. The resulting dispersion had a Hegman Gauge reading of 8:7:7 and was very fluid, having a Zahn Cup No. 4 reading of 8 seconds. In contrast, a similar dispersion prepared from untreated β-copper phthalocyanine pigment was thixotropic and had a poorer dispersion.

Blue tint acrylic paints were prepared from these dispersions by admixing with white acrylic paint and stoving. The paint derived from the pigment of Example 1 was found to be of similar strength and greener than the paint derived from the pigment not so treated.

EXAMPLE 30

The pigment of Example 26 was incorporated in a nitrocellulose varnish by ballmilling and subsequently reduced to 11.7% pigmentation at 1:1.38 pigment-:binder by the addition of a mixture of nitrocellulose and maleic condensate varnishes.

The resulting dispersion was found to have superior flow, strength and gloss compared to a similar dispersion prepared from β-copper pthalocyanine pigment untreated by dyestuff and amine.

TABLE 1

| Example No. | Stainer Flow No. 3 Zahn Cup (secs) | Fineness of Grind Hegman Gauge | 1:25 White Reduction Strength | Shade |
|---|---|---|---|---|
| 2(a) | 8.5 | 8:7:7 | 90-95 pts. strong | Greener |
| 2(b) | Too thick- no reading | 8:4:2 | Control (100 parts) | Control |
| 5 | 9 | 8:7:7 | Equal | Slightly Greener |
| 8 | 14 | 8:7:7 | Equal | Slightly Greener |
| 14 | 18 | 8:7:7 | Equal | Slightly Greener |
| 15 | 10 | 8:7:7 | 95-100 pts. Strong | Slightly Greener |
| 20 | 62 | 8:7:7 | 85-90 pts. Strong | Slightly Greener |

TABLE II

| Ex. No. | Stainer Fineness of Grind Hegman Gauge | Flow I.C.I. Cone and Plate | 1:25 White Reduction Strength | Shade |
|---|---|---|---|---|
| 3(a) | 8:7:7 | 3.7 poise | 85 pts. strong | Greener |
| 3(b) | 3:1:1 | Too thick | Control (100 parts) | Control |
| 6 | 8:7:6 | 7 poise | Equal | Slightly Redder |
| 21 | 8:7:7 | 7.5 poise | 80-85 pts. Strong | Greener |

TABLE III

| Ex. No. | Stainer Flow/Zahn Cup No. 3 | Flow/Zahn Cup No. 2 | 6% Pigmentation Ink Fineness of Grind Hegman Gauge | Strength | Shade | Gloss |
|---|---|---|---|---|---|---|
| 11(a) | 9 secs. | 20 secs. | 8:7:7 | 85-90 pts. Strong | Greener | Slightly |
| 11(b) | Too thick- no reading | 25 secs. | 8:7:6½ | Control (100 parts) | Control | Control |
| 17 | 18 secs. | 22 secs. | 8:8:7 | 75-80 pts. Strong | Greener | Superior |

TABLE IV

| Example No. | Stainer Flow/zahn Cup No. 3 | Flow/Zahn Cup No. 2 | 6% Pigmentation Ink Fineness of Grind Hegman Gauge | Strength | Shade | Gloss |
|---|---|---|---|---|---|---|
| 10(a) | 8.5 secs. | 19 secs. | 8:7:7 | 85-90 pts. Strong | Slightly Greener | Superior |
| 10(b) | Too thick- no reading | 26 sec.s | 8:7:7 | Control (100 pts) | Control | Control |
| 16 | 23 secs. | 22 secs. | 8:8:7 | 95-100 pts. Strong | Greener | Slightly Superior |
| 19(a) | 19 secs. | 21 secs. | 8:8:7 | 95-100 pts. strong | Greener | Equal |
| 19(b) | Too thick- no reading | 30 secs. | 8:7:7 | Control for 19(a) (100 pts.) | Control | Control |

Table V

| Example No. | Pigment Dyestuff Ratio | Pigment Composition (Parts) βCuPc | CuPc(SO₃H)₂ | Rosin Amine D | Dispersion Flow Zahn Cup No. 3(secs) | Fineness of Grind Hegman Gauge | Decorative Alkyd Paint 1.25 White Reduction Strength | Shade |
|---|---|---|---|---|---|---|---|---|
| 2(b) | 100:0 | 100 | — | — | Too thick- no reading | 8:4:2 | Control (100 parts) | Control |

Table V-continued

| Example No. | Pigment Dyestuff Ratio | Pigment Composition (Parts) | | | Dispersion | | Decorative Alkyd Paint 1.25 White Reduction | |
| --- | --- | --- | --- | --- | --- | --- | --- | --- |
| | | βCuPc | CuPc(SO$_3$H)$_2$ | Rosin Amine D | Flow Zahn Cup No. 3(secs) | Fineness of Grind Hegman Gauge | Strength | Shade |
| 22 | 96:4 | 96 | 4 | 3.6 | 14 (thixotropic) | 8:7:7 | 85–90 parts strong | Slightly greener |
| 23 | 94:6 | 94 | 6 | 5.4 | 9 | 8:7:7 | 90 parts strong | Slightly greener |
| 2(a) | 92:8 | 92 | 8 | 7.2 | 8.5 | 8:7:7 | 90–95 parts strong | Greener |
| 24 | 90:10 | 90 | 10 | 9 | 9 | 8:7:7 | 95–100 parts strong | Greener |
| 25 | 80:20 | 80 | 20 | 18 | 10 | 8:7:7 | 105–110 parts weak | Very green |

TABLE VI

| Example No. | Number of Free SO$_3$H per CuPc | Pigment Composition (Parts) | | | Dispersion | | Decorative Alkyd Paint 1:25 white reduction | |
| --- | --- | --- | --- | --- | --- | --- | --- | --- |
| | | beta-CuPc | Dyestuffs | R.A.D. | Flow Zahn Cup No. 3(secs) | Fineness of Grind Hegman Gauge | Strength | Shade |
| 2(b) | 0 | 100 | — | — | To thick: no reading | 8:4:2 | Control (100 parts) | Control |
| 26 | 1 | 92 | 8 | 2.9 | 9 | 8:7:7 | 90–95 pts. Strong | Slightly Greener |
| 27 | 1.5 | 92 | 8 | 4.2 | 8 | 8:7:7 | 95 parts. Strong | Slightly Greener |
| 15 | 2 | 92 | 8 | 5.4 | 10 | 8:7:7 | 95–100 pts. Strong | Slightly Greener |

We claim:

1. A phthalocyanine pigment composition comprising a phthalocyanine pigment and a sulphonated phthalocyanine derivative formed from sulphonated phthalocyanine dyestuffs having the formula:

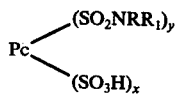

I and a sufficient quantity of dehydroabietylamine having the formula

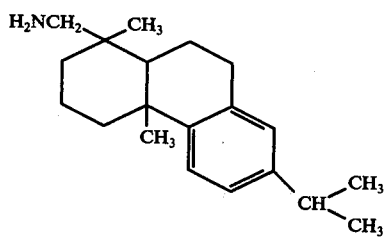

II to substantially neutralise the free sulphonic acid groups, wherein R represents a $C_1$ - $C_{22}$ cyclic or acyclic alkyl group, aryl, aralkyl group or a dehydroabietylamine residue; and $R_1$ represents hydrogen or a $C_1$ - $C_{22}$ cyclic or acyclic alkyl group, an aryl or an aralkyl group; the alkyl, cycloalkyl, aryl or aralkyl groups, R and $R_1$ may be optionally substituted with one or more hydroxyl groups; $x$ is from 1 to 4, $y$ is 0 or from 1 to 3 and the sum of $x + y$ is from 1 to 4, and wherein the ratio of phthalocyanine pigment to sulphonated phthalocyanine dyestuff is from 80:20 to 99:1 by weight.

2. A pigment composition as claimed in claim 1, in which the sulphonated phthalocyanine is a copper phthalocyanine.

3. A pigment composition as claimed in claim 1 in which the pigment is a copper phthalocyanine.

4. A pigment composition as claimed in claim 1, in which the ratio is from 90:10 to 96:4.

5. A pigment composition as claimed in claim 1, in which $x$ is 1 – 2.5 and $y$ is 0 – 3.

6. A pigment composition as claimed in claim 1, which also contains a urethane compound having two or more urethane groups and contains no significant proportion of basic amino groups.

* * * * *